United States Patent [19]
Brewer

[11] 3,961,585
[45] June 8, 1976

[54] CARGO NET

[75] Inventor: Harold Brewer, Lexington, Ky.

[73] Assignee: Irvin Industries, Inc., Greenwich, Conn.

[22] Filed: Nov. 11, 1974

[21] Appl. No.: 522,729

[52] U.S. Cl. .............................. 105/469; 105/467; 294/77
[51] Int. Cl.² ...................... B66C 1/12; B61D 45/00
[58] Field of Search ............... 294/67 E, 67 EA, 74, 294/77; 105/366 E, 377, 466, 467, 468, 469, 470, 463, 464, 473, 471; 150/52 F; 206/386; 214/10.5 R; 280/179 R, 179 A

[56] References Cited
UNITED STATES PATENTS

| | | | |
|---|---|---|---|
| 1,365,511 | 1/1921 | Lee | 294/77 |
| 2,455,237 | 11/1948 | Davis | 105/467 |
| 3,011,820 | 12/1961 | Frieder et al. | 294/77 |
| 3,084,966 | 4/1963 | Higgins | 294/77 |
| 3,173,539 | 3/1965 | Looker | 294/77 X |
| 3,204,798 | 9/1965 | Becker | 294/81 R X |
| 3,312,181 | 4/1967 | Davidson | 105/469 |
| 3,478,394 | 11/1969 | Davis | 105/469 X |

Primary Examiner—Johnny D. Cherry
Attorney, Agent, or Firm—Ryder, McAulay, Fields, Fisher & Goldstein

[57] ABSTRACT

A net of the type having a plurality of intersecting straps forming a lattice structure which is adapted to encompass a load to maintain the load on a support or a pallet. The net comprises a top section having diagonally extending interconnecting straps and integral front, rear, and side sections. The sections are adapted to be connected to the support to maintain a load within the net in place. The front and rear sections are connected to the side sections through the diagonally extending straps of the top section so that a portion of the forces applied to the front or rear section due to acceleration or deceleration of the load are transmitted to the side sections thereby to distribute the forces generated by the load.

Other features include means for encircling the load at an intermediate point independently of the sections thereby maintaining smaller loads centrally positioned on the support. Additionally, bracing straps are provided to eliminate undesirable movement of the side sections.

16 Claims, 6 Drawing Figures

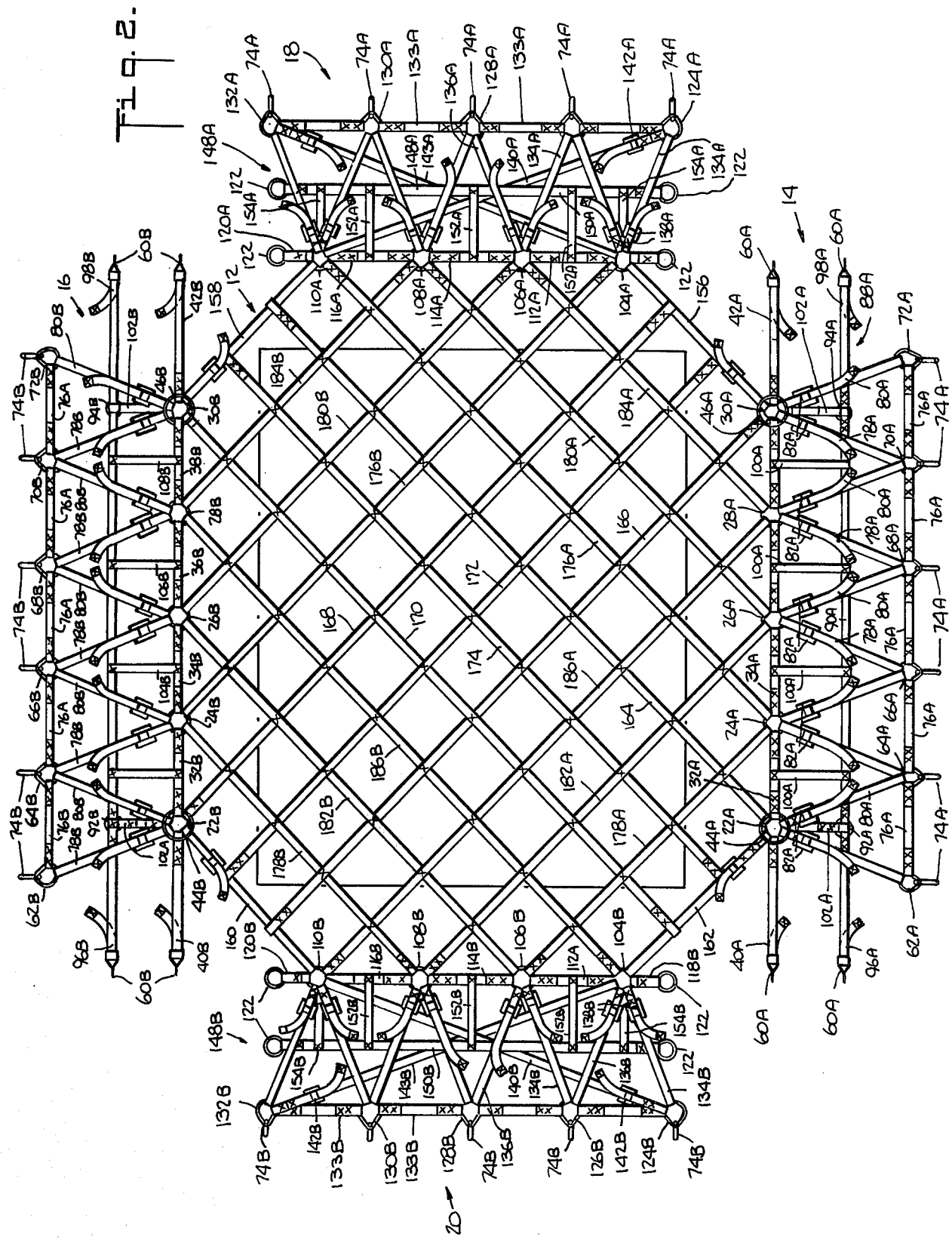

CARGO NET

This invention relates generally to a cargo net and, more particularly, pertains to a unitary or integral cargo net constructed so that forces on the front and rear of the net are distributed to the sides of the net, thereby decreasing the wear and tear on the front and rear sections.

At present, freight shipping by car or railroad or the like is performed on almost an assembly-line basis by securing the cargo, which usually comprises stacked boxes, to a pallet usually fabricated from wood. The pallet and cargo are then moved as a unit by forklift trucks or the like to load the cargo on a vehicle for shipment or to unload the cargo for delivery. Since the cargo per se is subject to many forces during shipment, primarily those due to acceleration or deceleration of the shipping medium, it is of primary importance that the means for securing the cargo on the pallet withstand such forces otherwise the cargo will break loose and consequently may be lost or damaged.

Various devices have been proposed for tying the cargo to the pallet. For example, one such device comprises placing a shrinkable plastic sheet over the cargo and pallet and then applying heat to the plastic to shrink it about the cargo. However, this arrangement requires costly heating equipment and limits the size of the load that can be accommodated by the heating equipment. Moreover, a slight puncture in the plastic usually results in a complete tearing of the sheet in a relatively short period of time.

Another arrangement, and one that is able to withstand greater forces than the "plastic" arrangement above, is the use of a cargo net. Presently, such nets comprise three separate elements: a top section that extends over the top of the load and includes straps that run directly from front to rear and are connected to the pallet at their ends; a first section that extends about a side and the front of the cargo; and, an identical second section that extends about the other side and the rear of the load or cargo. This arrangement has major drawbacks in view of the fact that three different elements are required to adequately secure the load. Moreover, the entire force of acceleration or deceleration is applied to the front and rear sections, thereby requiring extremely heavy duty elements to withstand such forces.

Accordingly, an object of this invention is to provide an improved cargo net.

A more specific object of this aspect of the invention is to provide a cargo net comprising a unitary or integral structure having front and rear sections connected to side sections through a top section.

Another object of this invention resides in the novel details of construction that provide a cargo net of the type described, wherein external forces applied to the front and rear sections of the net are transmitted to the side sections of the net to distribute the forces.

Accordingly, a net constructed in accordance with the present invention is of the type having a plurality of interconnected straps for securing a load to a support and comprises front and rear sections adapted to be connected to the support and respective side sections adapted to be connected to the support. Connectors are provided for connecting together the front and rear sections to the side sections so that the net surrounds the periphery of the load. A top section which is adapted to be placed over the top of the load is connected to the front and rear sections whereby forces on the front and rear sections are applied to the side sections so that forces are substantially distributed throughout the net rather than being localized on either the front or the rear sections of the net.

A feature of the present invention is the provision of adjustable straps that permit the net to be adjusted to accommodate differently sized loads.

Another feature of the present invention is the provision of bracing straps to connect the upper ends of the side sections to the opposite end of the support thereby minimizing shifting of the load.

A further feature of the invention is to fabricate the top section of the net from a material having greater stretchability than other portions of the net so that the top section absorbs any energy due to movement of the cargo while the lower portion of the net encases the cargo or load on the pallet.

Other features and advantages of the present invention will become more apparent from a consideration of the following detailed description when taken in conjunction with the accompanying drawings, in which:

FIG. 2 is a top plan view of a net constructed according to the present invention illustrating the net as it appears when all sections lie in the same plane;

Figure 1:
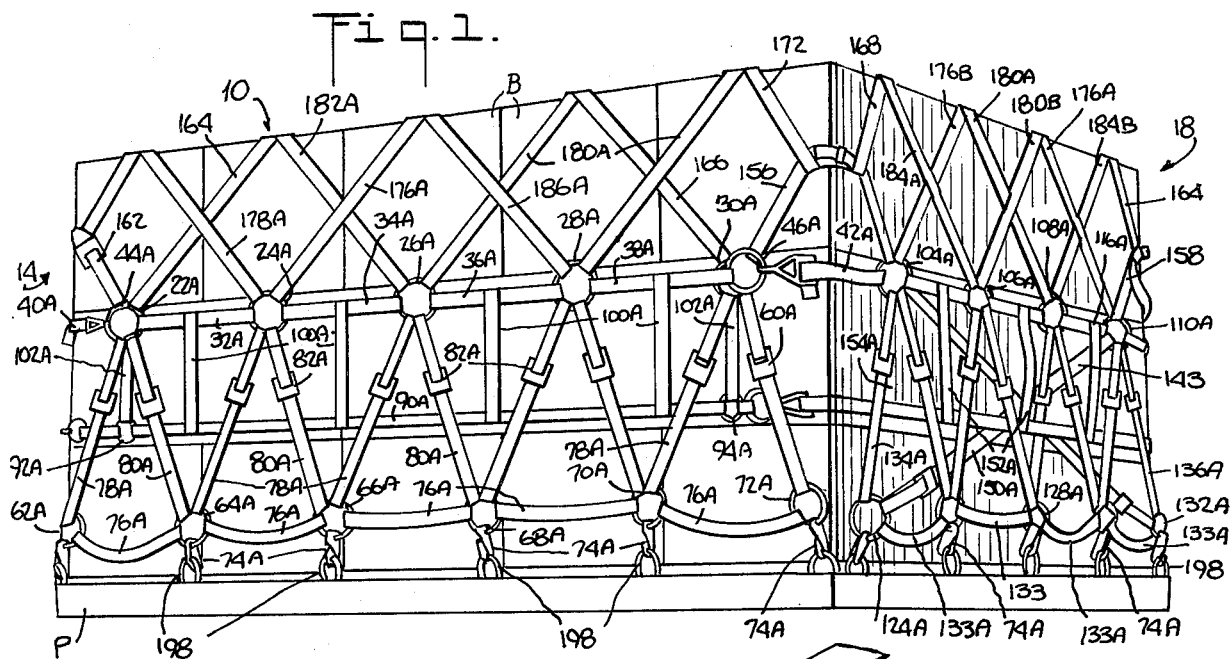
FIG. 1 is a perspective view of a cargo net constructed according to the present invention illustrating the use of the net to secure a cargo or load on a pallet.

A cargo net constructed according to the present invention is designated generally by the reference character 10 in FIG. 2 and comprises interconnected straps that provide a top section 12, a front section 14, a rear section 16 and opposed side sections 18 and 20. The front section 14 and the rear section 16 are identical in construction. Accordingly, for ease of description, the identical elements in sections 14 and 16 will be represented by the same reference numeral. However, the elements in the front section will be represented by an "A" suffix whereas the element in the rear section will be represented by a "B" suffix. Similarly, the side sections 18 and 20 are identical in construction. Accordingly, identical elements in the side sections will be represented by the same reference numeral. However, the elements comprising side section 18 will be designated with an "A" suffix whereas the corresponding elements in the side section 20 will be designated with a "B" suffix.

In view of the fact that sections 14 and 16 are identical in construction, only section 14 will be described in detail, it being understood that similar comments apply to the side section 16. Accordingly, front section 14 comprises a first set of connecting members in the form of rings 22A – 30A. Adjacent rings are connected together in a row by respective connecting straps 32A –

38A. Additionally, respective end straps 40A and 42A are connected to the rings 22A and 30A. That end of the strap 32A that is connected to the ring 22A also encircles a ring 44A which is superposed on the ring 22A, as shown more clearly in FIG. 5. Similarly, the strap 38A is connected to a ring 46A which is superposed on the ring 30A.

Figure 5:
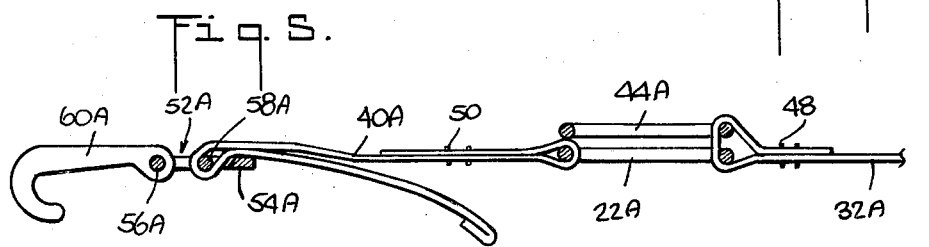
FIG. 5 is a detailed view of the connecting arrangement of the load encircling straps; and, FIG. 6 is a detailed view, to an enlarged scale, showing the adjustable connection of the straps.

As shown in detail in FIG. 5, the end of the strap 32A encircles the rings 22A and 44A and is folded back on itself and is affixed to the main portion of the web or strap by stitches 48. Similarly, the end of the strap 40A encircles the ring 22A and is folded back on itself and is connected to the main portion of the web by stitches 50. It is to be noted that all of the straps of the cargo net disclosed herein are connected to the various connecting members or rings in the same manner with the exception of the adjustable straps, noted below. The other end of the strap 40A extends through a conventional buckle arrangement 52A that permits the effective length of the strap 40A to be adjusted. That is, the buckle 52A comprises laterally extending end members 54A and 56A and central member 58A. The strap 40A is wrapped around the central member 58A by inserting the end of the strap downwardly between the members 58A and 56A, and upwardly between the members 58A and 54A. By pulling on the end of the strap, the buckle slides down the strap thereby decreasing the effective length of the strap 40A. On the other hand, if the buckle is pulled in the opposite direction, the buckle will move away from the ring 22A, thereby increasing the effective length of the strap. The member 56A mounts a hook 60A at the end thereof.

A second set of connecting members in the form of deformed rings 62A – 72A are provided and a securing device in the form of hooks 74A are connected to each one of the rings 62A – 72A. The hooks 74A are adapted to connect the associated ring to a corresponding ring on the pallet or load support, in the conventional manner. Adjacent ones of the rings 62A – 72A are connected together in a row by connecting straps 76A.

It will be noted that the set of connecting members comprising rings 62A – 72A includes one additional ring than the set comprising rings 22A – 30A. Accordingly, each one of the rings 22A – 30A is connected to two immediately adjacent ones of the rings 62A – 72A by respective load-distributing straps 78A and 80A. For example, the ring 22A is connected to the ring 62A by the strap 78A and the strap 80A connects the ring 22A to the ring 64A. In a similar manner, the ring 24A is connected to the ring 64A by the strap 78A and to the ring 66A by the strap 80A. The straps 78A and 80A are adjustable in length and are constructed in the same manner as disclosed below with respect to the strap 140A.

Since the rings 22A – 30A are connected to two adjacent ones of the rings 62A – 72A by the load-distributing straps 78A – 80A, it will be obvious that any force having a vertical component applied to a particular ring in the first set will be distributed between two rings in the second set of rings. For example, if any force having a vertical component is applied to the ring 24A, the force will be distributed between the rings 64A and 66A. This, in effect, reduces the total force applied to any one of the hooks 74 (which connect the net to the pallet) as compared to a construction wherein a single strap connected the upper ring to one lower ring.

The front portion of an intermediate load-encircling strap assembly is designated generally by the reference character 88A and is provided for purposes which will become clear from a consideration of the description below. The strap assembly 88A comprises a central portion 90A connected between rings 92A and 94A. Terminating straps 96A and 98A are respectively connected to the rings 92A and 96A. The terminating straps 96A and 98A are similar in construction to the terminating straps 40A and 42A. The strap portion 90A is connected to the respective connecting straps 32A – 38A by straps 100A which extend therebetween and maintain the portion 90A in substantially parallel and spaced relationship to the connecting straps and associated rings. Additionally, straps 102A respectively connect the rings 92A, 94A to the rings 22A, 30A. Thus, any forces applied to the strap assembly portion 88A will be transmitted to the rings 22A and 30A through the interconnecting straps 102A.

The side section 18 (and, therefore, the side section 20) similarly comprises an upper or third set of connecting members or rings 104A – 110A which are connected together in a row by respective connecting straps 112A – 116A. Terminating straps 118A and 120A connect end rings 122 to the respective rings 104A and 110A.

Similar to the construction of the front and rear sections, the side section also includes a lower or fourth set of connecting rings 124A – 132A which is greater than the third set by an additional ring. Hooks 74A connect the net rings 124A – 132A to the rings on the pallet or cargo support. Straps 133A connect adjacent ones of the rings 124A – 132A in a row. The rings 124A – 132A are connected to the rings 104A – 110A by load-distributing straps 134A and 136A in the same manner that the load-distributing straps 78A and 80A connect the rings 22A – 32A to the rings 62A –to 72A. Thus, the vertical component of any force applied to any one of the rings 104A – 110A will be distributed between the two rings connected thereto by the load-distributing straps. Additionally, the load-distributing straps 134A, 136A are adjustable in length by the buckle 138A, similarly to the straps 140A.

Figure 6:
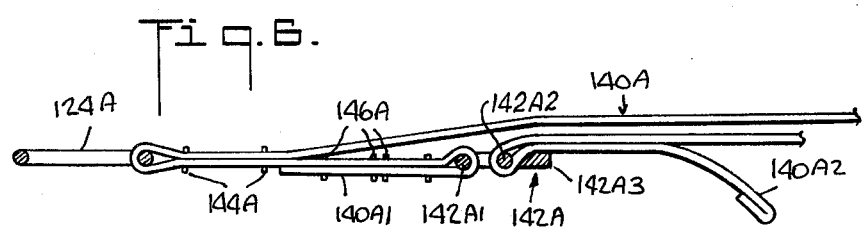

Each side section includes diagonally extending brace straps 140A, 143A which are adjustably connected between the end rings in the upper set of rings and the diagonally opposite end ring in the lower set of rings. More specifically, for example, one end of the strap 140A is threaded through the rings 110A and 124A and through a buckle 142A at the end adjacent the ring 124A, as shown in detail in FIG. 6. Thus, referring to FIG. 6, the end 140A1 of the strap 140A is threaded through the ring 124A and folded back on itself to form two layers which are stiched together at 144A. The end 140A1 is then threaded through the buckle 142A between members 142A1 and 142A2 and is folded back on itself to form two layers which are connected together by stitches 146A. The other end, 140A2 of the strap is threaded through the ring 110A and is folded back on itself and inserted downwardly through the space between the members 142A1 and 142A2 of the buckle 142A and upwardly through the space between the members 142A2 and 142A3. Thus, the effective length of the strap 140A may be shortened by pulling the end 140A2 of the strap. On the other hand, the effective length of the strap 140A may be lengthened by moving the strap in the opposite direction through the buckle.

In a similar manner, a brace strap 143A is connected between the rings 104A and 132A and is threaded through a buckle 142A to permit lengthening or shortening of the effective length of the strap. As noted above, the load-distributing straps 78A – 80A and 134A – 136A are constructed similarly to the strap 140A.

The side sections are also provided with a portion of the intermediate load-encircling strap assembly designated generally by the reference character 148A. The strap assembly 148A comprises a central strap 150A held in spaced and substantially parallel relationship to the ring connecting straps 112A – 116A by straps 152A that are connected between the strap 150A and the respective connecting straps 112A – 116A. Additionally, straps 154A are connected between the strap 150A and the respective rings 104A and 110A. The strap 150 terminates at each end in end rings 122.

The top section 12 comprises a plurality of interconnected straps that extend diagonally between the front and rear sections and the side sections so that forces applied to the front and rear sections are transmitted to the side sections via these diagonally extending straps.

More specifically, the end rings in the upper set of rings in adjacent sections are connected together by end straps. Thus, an end strap 156 connects together rings 30A and 104A. An end strap 158 connects together rings 110A and 30B. Rings 22B and 110B are connected together by an end strap 160 and an end strap 162 connects together rings 104B and 22A. Straps 156 – 162 are identical in construction to the brace strap 140A and are therefore adjustable in length. The end rings of the front and rear sections are also connected to the diagonally opposite end strap. More specifically, a strap 164 connects the ring 22A with the strap 158. The ring 30A is connected to the end strap 160 by a strap 166. Similarly, rings 22B and 30B are connected to the respective end straps 156 and 162 by the respective diagonally extending straps 168 and 170. In addition, end strap 156 is connected to end strap 160 by a strap 172 and a strap 174 is connected between end straps 158 and 162.

In accordance with the present invention, the remainder of the connecting members or rings of the front section 14 and the rear section 16 are connected to the remainder of the rings of the side sections 18 and 20 via diagonally extending straps which are interconnected to form the top section along with the end straps described hereinbefore. Since the connections of the front and rear sections to the side sections is similar, only the front section connections will be described, it being understood that the comments apply for the connections to the rear section. Accordingly, top straps which are connected to the front section will be designated by a reference numeral followed by the suffix "A" while the corresponding top straps connected to the rear section will be designated by the same reference numeral but with the suffix "B". For example, it will be noted that ring 24A is connected to the end ring 110A of section 18 by a strap 176A. Ring 24B, on the other hand, is connected to the other end ring 104A of the section 18 by the strap 176B. Ring 24A is also connected to the ring 106B by a strap 178A. It is to be noted that the ring 106B is immediately adjacent the end ring 104B of the side section 20. In a like manner, ring 24B of rear section 16 is connected to ring 108B by a strap 178B. It is to be noted that the ring 108B is also immediately adjacent the end ring 110B. Ring 26A of the front section is connected to rings 108A of side section 18 and 108B of side section 20 by respective straps 180A and 182A. Similarly, ring 28A is connected to ring 106A of side section 18 and 110B of side section 20 by the respective straps 184A and 186A. Thus, by interconnecting the front and rear sections and the side sections through the diagonally extending straps of the top section, forces applied to the front and rear sections will be distributed to the side sections, thereby decreasing the overall force applied to the front and rear sections.

In accordance with another aspect of this invention, a novel construction is utilized to interconnect the straps forming the top section. That is, if the straps forming the top section were laid upon each other and then stitched together, there would be a relatively high probability of shear under excessive loads. To be more specific, if the force is applied entirely to the front section of the net, a force will be exerted on those straps forming the top section that were connected to the front section. Hence, a shearing force would exist between those straps connected to the front section and all the other straps forming the top section. However, in accordance with the present invention, the connection between interconnecting straps is such that the forces are substantially equally distributed between the straps forming the top section.

Figure 3:
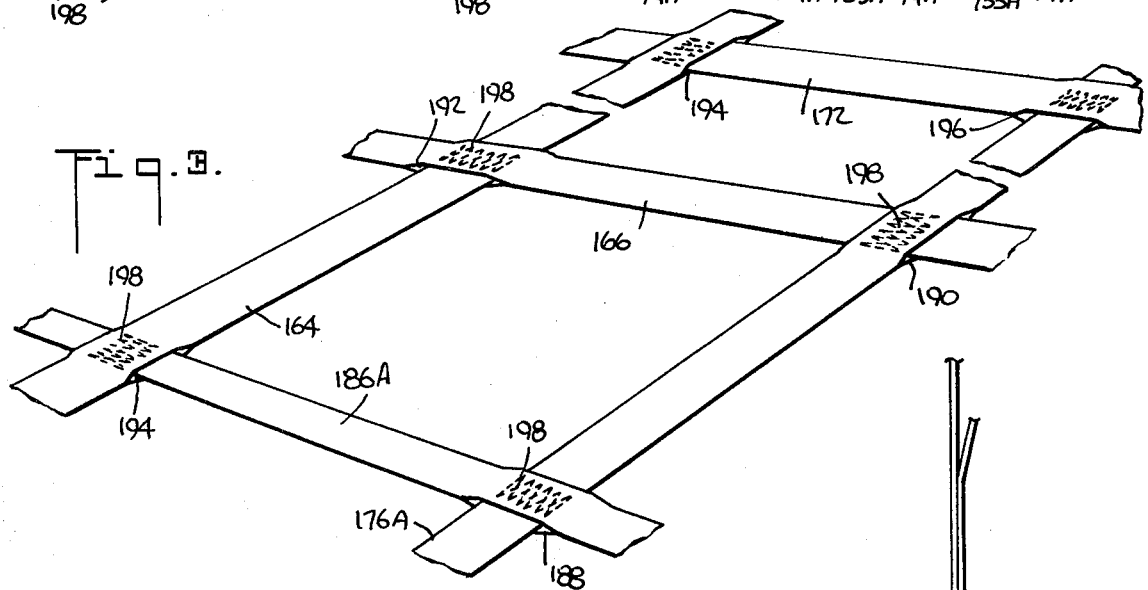
FIG. 3 is a detailed view, to enlarged scale and in perspective, illustrating the connecting arrangement between the straps forming the top section of the net shown in FIG. 2.

Thus, FIG. 3 shows a portion of the top section and illustrates the connecting arrangement of the straps forming the top section 12. As shown therein, the strap 186A is provided with a plurality of longitudinally spaced slots 188 which extend the entire width of the strap. Similar comments apply for the straps 176A, 166, 164, and 172 which are provided with longitudinally spaced slots 190, 192, 194, and 196, respectively. It will be obvious from a consideration of FIG. 3, that the slots on any respective strap are spaced so that alternate straps are received therethrough. For example, the strap 164 receives the strap 186A in the slot 194. However, at the next adjacent strap intersection, the strap 164 receives the strap 172 in the next pocket or slot 194. Thus, each strap is provided with slots that are spaced so that they receive intersecting belts therethrough only at alternating intersections. To put this another way, if a first strap receives a second strap in a slot at one intersection, then the first strap will, in turn, be received in a slot at an adjacent intersection. For example, it is noted that the strap 176A is received in the slot 188 of the strap 186A and the pocket or slot 196 of the strap 172. However, at the next adjacent intersection to the intersection of straps 176A and 186A, the strap 176A receives the strap 166 in the slot 190.

The straps are connected together by stitches at each intersection. More specifically, straps at each intersection are connected together with lines of stitches 198, which extend in a direction parallel to the longitudinal axis of the strap received through the particular pocket or slot. Thus, as shown in FIG. 3, the stitches at adjacent intersections are rotated 90° with respect to each other. This arrangement ensures that the forces will be substantially equally distributed throughout the straps comprising the top section 12. That is, assuming that the force is applied to the front section, forces will likewise be applied to those straps of the top section connected to the front section. However, because of the connection between adjacent straps of the top section, this force will also be distributed to those straps connected to the rear section via the pocket and stitch interconnection. Additionally, the possibility of shear occurring between interconnected straps is substantially decreased by the construction shown in FIG. 3.

The straps comprising the top section of the present invention are fabricated from a material having a greater stretch factor than the straps comprising the other sections of the net 10. That is, the straps of the top section can stretch to a greater degree than the straps comprising the remaining sections of the net. This arrangement permits the straps comprising the top section to absorb a portion of the energy of the moving load whereas the depending lower straps forming the front, rear and side sections encircle and maintain the load in place. In an actual construction, the top section was fabricated from a low elongation heat set nylon webbing having an 8,700 pound tensile strength and 18% to 20% elongation. The front, rear and side sections were fabricated from a polyester webbing having a 10,000 pound tensile strength and 12% – 14% elongation. However, double thickness of the polyester webbings were used so that the actual elongation was half the rated elongation.

FIG. 1 illustrates the operation of the net 10 of the present invention. As shown therein, the load or cargo comprises boxes "B" stacked upon each other on a support or pallet "P". Spaced about the periphery of the pallet P and permanently secured thereto are rings 198. The spacing between rings is substantially equal to the spacing between the hooks 74A on the net.

The net is placed over the cargo B and is positioned with the front section 14 at the front of the cargo and the rear section 16 at the rear of the cargo. As shown in FIG. 1, a portion of the top section extends downwardly along the sides of the cargo for a short distance. The hooks 74A are engaged with the respective rings 198.

Figure 4:
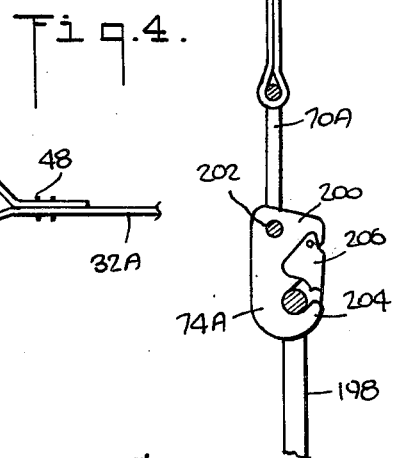
FIG. 4 is a detailed view, to enlarged scale, illustrating the arrangement for connecting the ends of the straps comprising the net of the present invention to a pallet or support.

Each hook 74A is conventional in construction and an illustrative embodiment thereof is shown in FIG. 4. As shown therein, the hook body 200 is pivotably connected to an associated ring such as ring 70A via an aperture 202 through which the ring is received. The body terminates in a hook end 204. The hook opening is closed by a spring-biased latch member 206 that is biased outwardly by a spring (not shown) to the position shown in FIG. 4. Accordingly, when the hooks 74A (and, therefore, the hooks 74B) are connected to the rings 198, the member 206 is engaged by the ring 198 and depressed rearwardly until the ring 198 is received in the hook end portion 204. The spring then biases the member 206 outwardly to the position shown in FIG. 4, thereby preventing accidental removal of the ring 198 from the hook end. However, when it is desired to remove the ring, the member 206 is depressed inwardly by the thumb and the ring is removed from the hook end 204.

The end straps 40A and 42A (and, therefore, straps 40B and 42B) are inserted through the rings 122 and folded back on themselves and the hooks 60A are secured to the respective rings 44A and 46A. It is to be noted that the hooks 60A could also be secured to the respective rings 22A and 30A. However, by supplying the two additional rings 44A and 46A, the total force applied to the rings 22A and 30A are decreased so that lower strength rings may be used.

Similar comments apply for the end straps 96A and 98A (and, 96B and 98B) which are inserted through the rings 122 connected to the strap 150A. The end straps 96A and 98A are likewise folded back on themselves and the hooks 60A are secured to respective rings 92A and 94A.

Thereafter, all adjustable straps are tightened to secure the net about the load.

The pallet P together with the cargo mounted thereon and constrained by the net may thereafter be placed on a medium such as a railway car. Acceleration or deceleration of the transporting medium will cause forces to be applied to the front or rear sections of the cargo net 10 due to the mass and the acceleration or deceleration of the load B. However, in accordance with the present invention, these forces will be distributed to the side sections of the net thereby decreasing the overall force on the front and rear sections. That is, since the front and rear sections 14 and 16 are connected to the side sections 18 and 20 via the top section 12 through the diagonally extending straps that interconnect the front and rear sections with the side sections, forces on either the front or rear section are distributed to the side sections.

In addition, the inverted V-straps 78A and 80A (78B and 80B) and 134A and 136A (134B and 136B) further aid in distributing the load from the upper set of rings connected to the top section to the lower set of rings connected to the other ends of the aforementioned straps. That is, the forces are further distributed because each ring in the upper set is connected to two rings in the lower set.

In addition to the above, the diagonally extending straps 140A and 143A on the side sections 18 and 20 further aid to stabilize the load in two respects. In the first place, the diagonally extending straps of the side sections tie the end ring such as 104A directly to the opposite end of the pallet P. Thus, if a force is applied to the front section due to a sudden deceleration of the load, the ring 104A would tend to move forwardly. However, the strap 143A acts as a brace to maintain the ring in place. Additionally, the strap applies the force on the ring 104A directly to the opposite side of the pallet. Obviously, similar comments apply to the ring 110A (and therefore, 110B) upon sudden accelerations of the load, where the forces are applied to the rear section 16.

The straps 90A (and 90B) and 150A (and 150B) serve to maintain the load centrally located on the pallet even though the load may be smaller than the actual size of the pallet. More specifically, the straps 102A connect the straps 90A with the rings 22A and 30A. In a similar manner, the strap 154A connects the strap 150A with the rings 104A and 110A. Accordingly, if a force appears which would tend to move the load off center, a restraining force will appear through the upper set of rings and the diagonally extending straps of the top section connected thereto to maintain the load on center. As an example, assuming that the load tends to move toward the front, a force will be applied to the ring 22A through the straps 90A and 102A. This force will be transmitted to the ring 104B through the strap 162. Hence, a restraining force will be set up through the straps 154B and 140B (and through the corresponding portions of the side section 18) to maintain the load in place.

While a preferred embodiment of the invention has been shown and described herein, it will become obvious that numerous omissions, changes and additions may be made in such embodiment without departing from the spirit and scope of the present invention.

What is claimed is:

1. A net of the type having a plurality of interconnected straps for securing a load to a support comprising:
   a. front and rear sections adapted to be connected to the support;
   b. respective side sections adapted to be connected to the support;
   c. connectors for connecting together said front and rear sections to said side sections whereby said net surrounds the periphery of the load;
   d. and a top section adapted to be placed over the top of the load and connecting said front and rear sections to said side sections whereby forces on said front and rear sections are applied to said side sections, said top section comprising diagonally extending straps for connecting respective intermediate points on said front and rear sections to different intermediate points on said side sections, said front and rear sections being identical in construction and comprising at least a first set of longitudinally spaced connecting members, said side sections being identical in construction and comprising at least a first set of laterally spaced connecting members, said diagonally extending straps interconnecting respective ones of said first set of longitudinally spaced connecting members of said front and rear sections to different ones of said first set of laterally spaced connecting members of said side sections.

2. A net as in claim 1, in which said front, rear and side sections further comprise connecting straps for connecting together the members comprising said first set of longitudinally spaced connecting members and for connecting together the members comprising said first set of laterally spaced connecting members.

3. A net as in claim 2, in which said first set of laterally spaced connecting members comprises one less in number than said first set of longitudinally spaced connecting members, said top section comprising corner straps connecting the end connecting members of said front and rear sections to the respective adjacent end connecting members on said side sections, and end straps connecting the end connecting members of said front and rear straps to the diametrically opposite corner strap.

4. A net as in claim 3, and adjustment means for adjusting the length of said corner straps.

5. A net as in claim 2, and a second set of longitudinally spaced connecting members greater in number than said first set, connecting straps connecting together adjacent ones of said connecting members in said second set, securing means on each connecting member in said second set for securing the member to the support, and a plurality of load-distributing straps for connecting each connecting member in said first set to two immediately adjacent ones of said connecting members in said second set.

6. A net as in claim 5, and a second set of laterally spaced connecting members wherein adjacent ones of said connecting members in said second set of laterally spaced connecting members are connected together by respective straps, said second set of laterally spaced connecting members having one additional connecting member than said first set of laterally spaced connecting members, securing means on each laterally spaced connecting member in said second set for securing the member to the support, and a plurality of load-distributing straps for connecting each laterally spaced connecting member in said first set to two immediately adjacent laterally spaced connecting members in said second set.

7. A net as in claim 6, in which said securing means comprises hooks adapted to engage rings on the support, and closure members on said hooks biased to a closed position.

8. A net as in claim 6, and adjustment means for adjusting the length of said intermediate straps.

9. A net as in claim 6, in which said connecting members comprise rings, and said connectors for connecting together said front and rear and side sections comprising adjustable terminating straps connected to said front and rear sections having securing members connected to the ends thereof, and securing rings on said side sections adapted to receive said straps therethrough, whereby said terminating straps are adapted to extend through said terminating rings and are adapted to be connected to rings in said first longitudinally spaced set of connecting rings by said securing members.

10. A net of the type having a plurality of interconnected straps for securing a load to a support comprising front and rear sections adapted to be connected to the support; respective side sections adapted to be connected to the support; connectors for connecting together said front and rear sections to said side sections whereby said net surrounds the periphery of the load; and a top section adapted to be placed over the top of the load and connecting said front and rear sections to said side sections whereby forces on said front and rear sections are applied to said side sections; said top section being fabricated from a material having a greater stretch factor than said front, rear and side sections; all of the straps comprising said top section being fabricated from the same material so that the stretch factor of said top section is uniform.

11. A net of the type having a plurality of interconnected straps for securing a load to a support comprising front and rear sections adapted to be connected to the support; respective side sections adapted to be connected to the support; connectors for connecting together said front and rear sections to said side sections whereby said net surrounds the periphery of the load; and a top section adapted to be placed over the top of the load and connecting said front and rear sections to said side sections whereby forces on said front and rear sections are applied to said side sections, said front and rear sections being identical in construction and comprising first partial load-encircling means connected to said top section, and second partial load-encircling means connected to said first partial load-encircling means, said side sections being identical in construction and comprising third partial load-encircling means connected to said top section, and fourth partial load-encircling means connected to said third partial load-encircling means, whereby said first and third partial load-encircling means are adapted to be connected together and said second and fourth partial load-encircling means are adapted to be connected together to form a continuous load-encircling means to maintain a load in place on the support.

12. A net as in claim 11, in which said first and third partial load-encircling means comprises a plurality of connecting members connected to said top section, and connecting straps connecting together said connecting members; said second and fourth partial load-encircling means comprising intermediate straps extending substantially parallel to said connecting straps, and a plurality of joining straps for connecting said intermediate straps to said first and third partial load-encircling means.

13. A net as in claim 12, in which at least two of said joining straps connect said intermediate strap to said end connecting members of said respective first and third partial load-encircling means, and others of said plurality of joining straps connect said intermediate strap to said connecting straps.

14. A net of the type having interconnected straps forming a lattice structure adapted to maintain a load in place on a support, said net comprising individual side wall sections adapted to be connected together to surround the load, each of said side wall sections having securing means for connecting said side wall sections to the support, at least a pair of opposed ones of said side wall sections each comprising a substantially horizontally extending partial load-encircling band having connecting members adjacent each end thereof, and straps connecting said connecting members to the diagonally opposite securing means of said side wall section, each of said side wall sections comprising a partial load-encircling band having a first plurality of interconnected connecting members; a second plurality of connecting members, securing means on each of said second plurality of connecting members for connecting said second plurality of connecting members to said support, said second plurality being greater than said first plurality by one member, and load-distributing straps connecting each one of said plurality of connecting members to two juxtaposed connecting members of said second plurality to form an inverted V-shape.

15. A net as in claim 14, and adjustment means for adjusting the length of said diagonally extending and said load-distributing straps.

16. A net of the type having interconnected straps forming a lattice structure for maintaining a load on a support comprising a top section adapted to extend over the top of the load, said top section comprising a plurality of interconnected straps, connecting members at the ends of said top section straps, load-distributing straps connected to said connecting members and adapted to extend downwardly therefrom along the sides of the load, fastening means connected to said load-distributing straps to connect said load-distributing straps to said support, connecting straps between said connecting members adapted to be connected together to form a first load-encircling band, and a second load-encircling band depending from said first load-encircling band and adapted to encircle the load at a point spaced intermediate said first load-encircling band and said fastening means, said second load-encircling band comprising a first strap spaced from said connecting straps, and a plurality of intermediate straps, at least selected ones of said plurality of intermediate straps connected between said first strap and said connecting straps, and others of said plurality of intermediate straps connected between said first strap and said connecting members.

* * * * *

UNITED STATES PATENT AND TRADEMARK OFFICE
CERTIFICATE OF CORRECTION

PATENT NO. : 3,961,585
DATED : June 8, 1976
INVENTOR(S) : Harold Brewer

It is certified that error appears in the above-identified patent and that said Letters Patent are hereby corrected as shown below:

Col. 2, line 53, change "element" to --elements--.

Col. 3, line 65, change "74" to --74A--.

Col. 4, line 8, change "96A" to --94A--

Col. 4, line 37, change "62A -to 72A" to --62A - 72A--.

Col. 5, line 18, change "150" to --150A--.

Col. 7, line 63, change "force" to --forces--.

Signed and Sealed this

Nineteenth Day of October 1976

[SEAL]

Attest:

RUTH C. MASON
*Attesting Officer*

C. MARSHALL DANN
*Commissioner of Patents and Trademarks*